(12) United States Patent
Gollier

(10) Patent No.: US 10,241,256 B2
(45) Date of Patent: Mar. 26, 2019

(54) LIGHT GUIDES WITH REDUCED HOT SPOTS AND METHODS FOR MAKING THE SAME

(71) Applicant: CORNING INCORPORATED, Corning, NY (US)

(72) Inventor: Jacques Gollier, Redmond, WA (US)

(73) Assignee: Corning Incorporatedf, Corning, NY (US)

( * ) Notice: Subject to any disclaimer, the term of this patent is extended or adjusted under 35 U.S.C. 154(b) by 0 days.

(21) Appl. No.: 15/572,619

(22) PCT Filed: May 11, 2016

(86) PCT No.: PCT/US2016/031777
§ 371 (c)(1),
(2) Date: Nov. 8, 2017

(87) PCT Pub. No.: WO2016/183148
PCT Pub. Date: Nov. 17, 2016

(65) Prior Publication Data
US 2018/0136387 A1    May 17, 2018

Related U.S. Application Data

(60) Provisional application No. 62/160,855, filed on May 13, 2015.

(51) Int. Cl.
*G02B 6/00* (2006.01)
*F21V 8/00* (2006.01)

(52) U.S. Cl.
CPC ......... *G02B 6/0065* (2013.01); *G02B 6/0021* (2013.01); *G02B 6/0038* (2013.01); *G02B 6/0068* (2013.01); *G02B 6/0091* (2013.01)

(58) Field of Classification Search
CPC ....................................................... G02B 6/00
(Continued)

(56) References Cited

U.S. PATENT DOCUMENTS 5,070,431 A * 12/1991 Kitazawa ............. G02B 6/0021
                                                362/23.15
6,204,898 B1 * 3/2001 Maeda ................. G02B 6/0036
                                                349/58
(Continued)

FOREIGN PATENT DOCUMENTS

CN    103511980 A    1/2014
EP    2781296 A1    9/2014
(Continued)

OTHER PUBLICATIONS

International Search Report and Written Opinion of the International Searching Authority; PCT/US2016/031777; dated Jul. 15, 2016; 13 Pages; European Patent Office.
(Continued)

*Primary Examiner* — Kaveh C Kianni
(74) *Attorney, Agent, or Firm* — Ryan T. Hardee

(57) ABSTRACT

Disclosed herein are glass light guide plates comprising a first surface, an opposing second surface, and a thickness extending therebetween; and a side edge comprising a plurality of arch-shaped recesses. Display devices comprising such light guides are also disclosed herein as well as methods for producing such light guides.

10 Claims, 7 Drawing Sheets

(58) Field of Classification Search
USPC .......................................................... 385/131
See application file for complete search history.

(56) References Cited

U.S. PATENT DOCUMENTS

| | | | | |
|---|---|---|---|---|
| 6,601,962 | B1* | 8/2003 | Ehara | G02B 6/0016 362/558 |
| 7,153,017 | B2* | 12/2006 | Yamashita | G02B 5/045 362/606 |
| 9,517,963 | B2 | 12/2016 | Marjanovic et al. | |
| 9,687,936 | B2 | 6/2017 | Marjanovic et al. | |
| 9,701,563 | B2 | 7/2017 | Bookbinder et al. | |
| 9,815,730 | B2 | 11/2017 | Marjanovic et al. | |
| 9,850,160 | B2 | 12/2017 | Marjanovic et al. | |
| 2003/0058382 | A1* | 3/2003 | Tanoue | G02B 6/0028 349/65 |
| 2004/0012945 | A1* | 1/2004 | Yamashita | G02B 5/045 362/612 |
| 2004/0130882 | A1* | 7/2004 | Hara | G02B 6/0016 362/609 |
| 2004/0130911 | A1* | 7/2004 | Chen | G02B 6/0021 362/558 |
| 2006/0083028 | A1* | 4/2006 | Sun | G02B 6/0016 362/615 |
| 2006/0215418 | A1 | 9/2006 | Uehara et al. | |
| 2007/0171671 | A1* | 7/2007 | Kurokawa | B32B 3/30 362/606 |
| 2007/0217224 | A1* | 9/2007 | Kao | G02B 6/0016 362/615 |
| 2008/0143560 | A1* | 6/2008 | Shipman | G06F 3/0238 341/22 |
| 2008/0151142 | A1* | 6/2008 | Noba | G02B 6/0023 349/65 |
| 2008/0186733 | A1* | 8/2008 | Ho | G02B 6/0021 362/610 |
| 2009/0109683 | A1* | 4/2009 | Miyashita | G02B 5/045 362/297 |
| 2009/0190069 | A1* | 7/2009 | Dejima | G02B 6/0036 349/65 |
| 2010/0085750 | A1* | 4/2010 | Van Ostrand | G02B 6/0028 362/235 |
| 2010/0193978 | A1* | 8/2010 | Lee | G02B 6/0038 264/1.24 |
| 2010/0296284 | A1* | 11/2010 | Kawashima | G02B 6/0021 362/235 |
| 2011/0058121 | A1* | 3/2011 | Yabe | G02B 6/002 349/62 |
| 2011/0305003 | A1* | 12/2011 | Lee | G02B 6/0021 362/97.1 |
| 2012/0044441 | A1* | 2/2012 | Shigeta | G02B 6/0021 349/65 |
| 2012/0140519 | A1* | 6/2012 | Sakai | G02B 6/0016 362/608 |
| 2012/0258191 | A1* | 10/2012 | Kim | G02B 6/0036 425/385 |
| 2013/0126573 | A1 | 5/2013 | Hosseini et al. | |
| 2015/0049313 | A1* | 2/2015 | Chen | G02B 6/0031 353/99 |
| 2015/0117053 | A1* | 4/2015 | Zhu | G02B 6/0035 362/608 |
| 2015/0165548 | A1 | 6/2015 | Marjanovic et al. | |
| 2015/0165560 | A1 | 6/2015 | Hackert et al. | |
| 2015/0165563 | A1 | 6/2015 | Manley et al. | |
| 2015/0166393 | A1 | 6/2015 | Marjanovic et al. | |
| 2015/0166396 | A1 | 6/2015 | Marjanovic et al. | |
| 2015/0168637 | A1* | 6/2015 | Chen | G02B 6/0068 362/609 |
| 2015/0234114 | A1* | 8/2015 | Nakashima | G02B 6/0036 362/611 |
| 2016/0047971 | A1* | 2/2016 | Kim | G02B 6/0055 362/606 |
| 2016/0124270 | A1* | 5/2016 | Shimizu | G02B 6/0016 362/621 |
| 2016/0306094 | A1* | 10/2016 | Zhu | G02B 6/0021 |
| 2017/0068037 | A1* | 3/2017 | Lin | G02F 1/133603 |

FOREIGN PATENT DOCUMENTS

| | | |
|---|---|---|
| WO | 2011019785 A1 | 2/2011 |
| WO | 2014041828 A1 | 3/2014 |
| WO | 2014058748 A1 | 4/2014 |
| WO | 2014147048 A2 | 9/2014 |

OTHER PUBLICATIONS

Rao et al; "Masking LED Hot Spots in a Thin Direct Lit Backlight Unit Using Semitransparent and Perforated Masks"; Optics Communications, 315 (2014) 258-264.

* cited by examiner

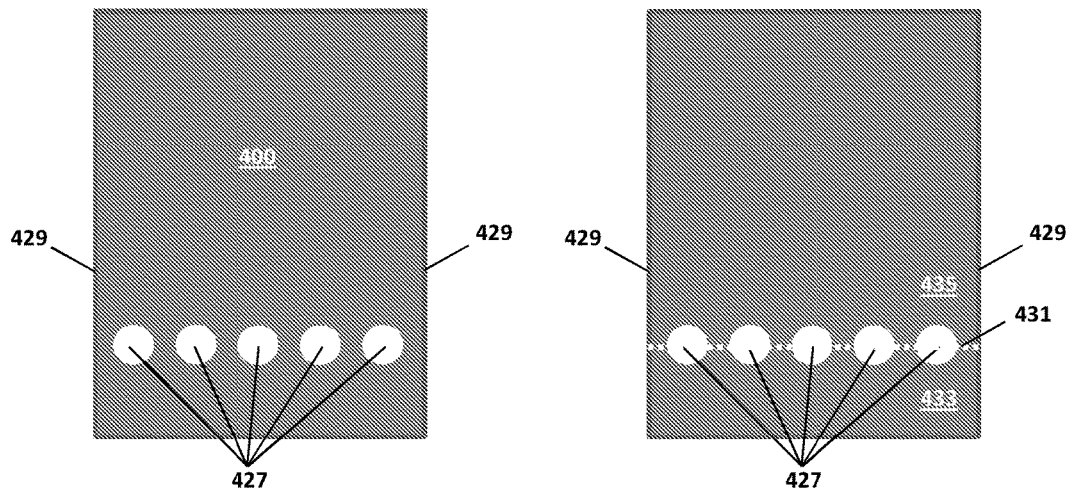
FIG. 7A
FIG. 7B
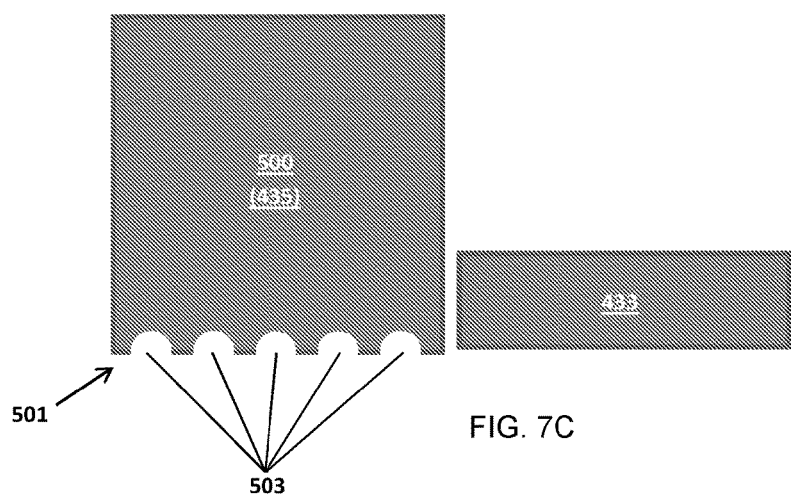
FIG. 7C

LIGHT GUIDES WITH REDUCED HOT SPOTS AND METHODS FOR MAKING THE SAME

CROSS-REFERENCE TO RELATED APPLICATIONS

This application claims the benefit of priority under 35 U.S.C. § 371 of International Patent Application Serial No. PCT/US16/31777, filed on May 11, 2016, which in turn, claims the benefit of priority of U.S. Provisional Patent Application Ser. No. 62/160,855 filed on May 13, 2015, the contents of each of which are relied upon and incorporated herein by reference in their entireties.

FIELD OF THE DISCLOSURE

The disclosure relates generally to light guides and display devices comprising such light guides, and more particularly to glass light guides with reduced hot spots and methods for making the same.

BACKGROUND

Liquid crystal displays (LCDs) are commonly used in various electronics, such as cell phones, laptops, electronic tablets, televisions, and computer monitors. Increased demand for larger, high-resolution flat panel displays drives the need for large high-quality glass substrates for use in the display. For example, glass substrates may be used as light guide plates in LCDs, to which a light source may be coupled. The thinness and/or screen size of an LCD device may be affected by the size and/or properties of the light-emitting and/or light-incident surfaces of the light guide.

The light-incident surface area of a glass substrate can be affected by the method by which the glass is cut. For instance, glass can be cut by a mechanical scoring technique to provide perforated dashes along which the glass can be broken a relatively straight line; however, this method may cause significant damage to the edge of the glass. To improve reliability and reduce chipping, the edges of the glass can be finished, often by introduction of a chamfer, which may eliminate all or a part of the damaged portion of the glass. While this technique may improve glass reliability, it may have adverse effects from an optical standpoint, as the chamfer can reduce the surface area at the edge of the light guide that is available to couple the light from the LED into the light guide. It would therefore be advantageous to reduce chamfering of the light-incident edge, as this may allow for a thinner light guide and thus a thinner overall LCD device.

The light-emitting surface area of a glass substrate can be affected by the presence of "hot spots" at the light-incident edge. Strips of LEDs, which can be optically coupled with the light guide plate, may comprise a plurality of individual LEDs, each separated by a gap. As a result of the gaps between each LED, the light emitted by the LEDs must propagate a significant distance down the light guide plate until homogeneous light is produced. The area on the light guide plate which does not receive homogeneous light is known as a hot spot zone. Hot spot zones are typically not usable for display and may be covered by a bezel or other structure around the perimeter of the display, which can limit the amount of the screen available to display an image. It would thus be advantageous to reduce the size of the hot spot zone, as this may allow for the production of LCDs with larger displays and thinner bezels.

Accordingly, it would be advantageous to provide light guide plates for display devices which address the aforementioned drawbacks, e.g., glass light guide plates with improved optical properties at the light-incident edges and reduced hot spot zones.

SUMMARY

The disclosure relates, in various embodiments, to a glass light guide plate comprising a first surface, an opposing second surface, and a thickness extending therebetween; and at least one side edge comprising a plurality of arch-shaped recesses or cutouts.

In certain embodiments, the first and/or second surface can comprise a plurality of light extraction features for scattering light. The light extraction features may be produced, for example, by laser damaging, acid etching, or coating the surface, e.g., with $TiO_2$. In a further embodiment, the light guide plate may include a plurality of holes extending through the thickness of the glass light guide, wherein the plurality of holes are proximate the at least one side edge. In addition, the glass light guide plate may further comprise a side edge having a plurality of interconnected arch-shaped recesses.

Methods for making such glass light guide plates are also disclosed, the methods comprising providing a glass sheet having at least one side edge, a first surface, and an opposing second surface with a thickness extending therebetween. The sheet can be processed to provide a plurality of rounded holes arranged substantially in a line and extending through the thickness of the sheet and proximate the at least one side edge. A portion of glass can be separated from the glass sheet along the line of rounded holes, thereby providing the glass sheet with a new side edge comprising a plurality of arch-shaped recesses.

In a first embodiment, the portion of glass may be separated from the glass sheet by propagating a crack between the rounded holes, the crack extending substantially in a line across the plurality of rounded holes, thereby providing the glass sheet with a new side edge comprising a plurality of spaced-apart arch-shaped recesses. In a second embodiment, the portion of glass may be separated from the glass sheet by etching, e.g., acid etching, thereby providing a glass sheet with a new side edge comprising a plurality of interconnected arch-shaped recesses.

In a further embodiment, the glass sheet may be further processed to provide a plurality of additional holes through the thickness of the glass sheet proximate the side edge comprising a plurality of arch shaped recesses. In addition, the first surface and/or the opposing second surface can be treated to produce a plurality of light extraction features.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings, wherein, when possible, like numerals refer to like components, it being understood that the appended figures are not necessarily drawn to scale.

FIGS. 7A-C illustrate a method of manufacture of the light guide plate comprising a side edge having a plurality of arch-shaped recesses.

DETAILED DESCRIPTION

Light Guides

Figure 1A:
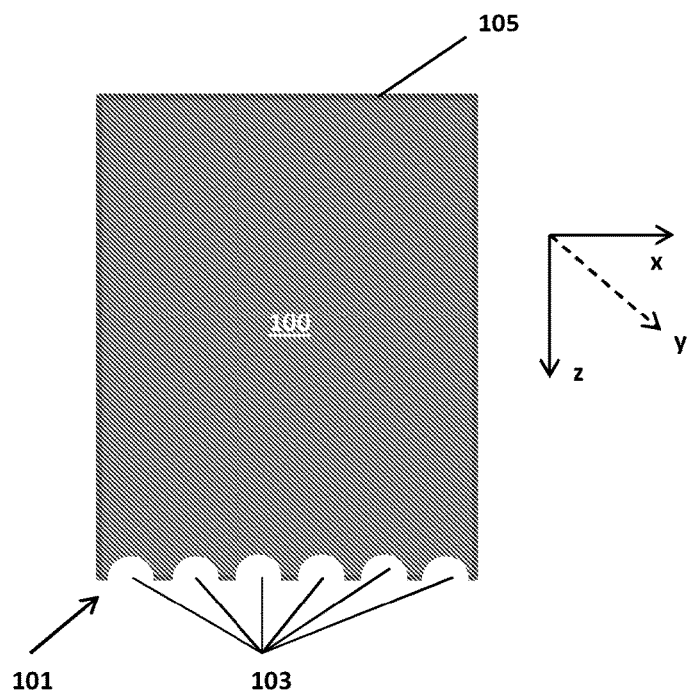
FIG. 1A illustrates a top view of a glass light guide plate comprising a side edge having a plurality of arch-shaped recesses according to certain embodiments of the disclosure.

Disclosed herein are light guide plates comprising a first surface and an opposing second surface, and a thickness extending therebetween; and at least one side edge comprising a plurality of arch-shaped recesses or cutouts. In additional embodiments, the arch-shaped regions can be interconnected or spaced-apart. In a further embodiment, the glass light guide plate can include a plurality of additional holes extending through the thickness of the light guide plate, wherein the plurality of additional holes are proximate the at least one side edge.

As used herein, the term "arch-shaped" recess is intended to denote a recess having a rounded edge, such as an arcuate shape, e.g., a semi-circular or semi-elliptical shape, or a complete or incomplete arched shape. The recess can be envisioned as a rounded hole that is cut along any two points of the hole to produce a rounded arch. The two points may be defined by the diameter of the rounded hole, e.g., producing a semi-circular or semi-elliptical recess, or any two points having a distance between them that is shorter than the diameter, e.g., producing a portion of a circle or oval. The recesses can, in certain embodiments, extend along the (X/Z) plane of the light guide plate, e.g., such that the apex or furthest point of the arcuate shape from the side edge extends inward from the side edge of the glass light guide plate, for example, towards an opposing side edge. The recess can extend through the entire thickness of the light guide plate, e.g., extending from the first surface to the second surface.

As used herein, the term "light-emitting surface" is intended to denote a surface from which light is emitted from the light guide plate toward a viewer. For instance, the first or second surface can be a light-emitting surface. Similarly, the term "light-incident surface" is intended to denote a surface that is coupled to a light source, e.g., an LED, such that light enters the light guide. For example, the side edge of the light guide plate can be a light-incident surface.

The glass light guide plate may comprise any material known in the art for use as a glass light guide plate including, but not limited to, aluminosilicate, alkali-aluminosilicate, borosilicate, alkali-borosilicate, aluminoborosilicate, alkali-aluminoborosilicate, and other suitable glasses. In certain embodiments, the light guide plate may have a thickness of less than or equal to about 3 mm, for example, ranging from about 0.3 mm to about 2 mm, from about 0.7 mm to about 1.5 mm, or from about 1.5 mm to about 2.5 mm, including all ranges and subranges therebetween. Non-limiting examples of commercially available glasses suitable for use as a light guide plate include, for instance, EAGLE XG®, Gorilla®, Iris™, Lotus™, and Willow® glasses from Corning Incorporated.

The light guide plate may comprise a first surface and an opposing second surface. The surfaces may, in certain embodiments, be planar or substantially planar, e.g., substantially flat and/or level. The first and second surfaces may, in various embodiments, be parallel or substantially parallel. The glass light guide may further comprise at least one side edge, for instance, at least two side edges, at least three side edges, or at least four side edges. By way of a non-limiting example, the light guide plate may comprise a rectangular or square glass sheet having four edges, although other shapes and configurations are envisioned and are intended to fall within the scope of the disclosure.

Hot spots may, in some embodiments, be reduced by introducing a diffusing surface on the light-incident edge of the glass to spread the light over a wider angle inside the light guide plate. The diffuser may be configured to diffuse light in the plane of the light guide plate, i.e., the (X/Z) plane, while minimizing diffusion in the plane perpendicular to the light guide, i.e., the (Y/Z) plane, to avoid leakage of light (see, e.g., FIG. 1A, which depicts a light guide in the (X/Z) plane). Diffusing surfaces can comprise, for example, microstructures such as prisms on the edge of the light guide plate.

According to a first embodiment illustrated in FIG. 1A, the glass light guide plate 100 can have a side edge 101, the side edge 101 comprising a plurality of arch-shaped recesses 103. In some embodiments, the recesses can extend along the (X/Z) plane of the light guide plate, e.g., toward an opposing side edge 105. Moreover, while the recesses 103 are illustrated as semi-circular in FIG. 1A, it is to be understood that any arched shape can be used, including semi-elliptical arches having a length longer than a diameter of the arch, or any other rounded shape or portion of a shape. It is also to be understood that, while FIG. 1A illustrates a light guide having six arch-shaped recesses, any number of recess is possible and envisioned, for example two or more recesses, such as five or more, ten or more, twenty or more, fifty or more, or a hundred or more recesses.

Figure 1B:
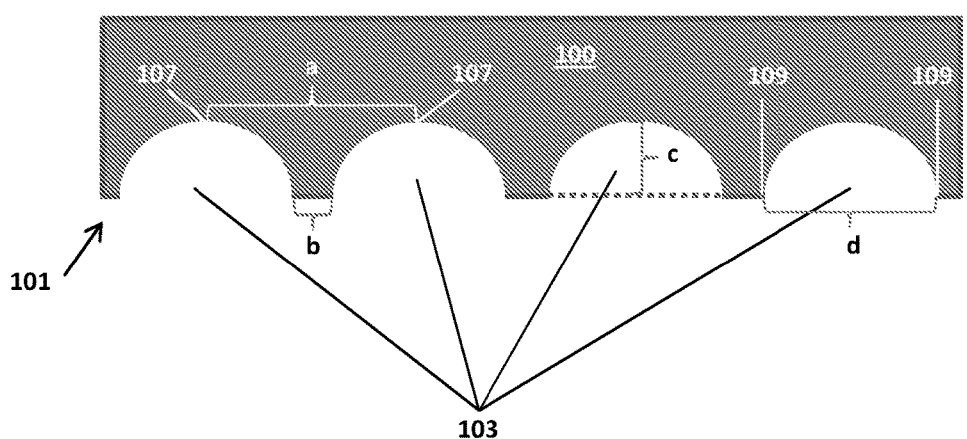
FIG. 1B illustrates an enlarged top view of the side edge of a glass light guide having a plurality of arch-shaped recesses according to various embodiments of the disclosure.

For purposes of discussion, FIG. 1B provides an enlarged top view of several recesses 103 present on the side edge 101 of the glass substrate 100. A width or diameter d of each recess 103 can range, in some embodiments, from about 1 micron to about 5 microns, such as from about 1.5 microns to about 4 microns, from about 2 microns to about 3.5 microns, or from about 2.5 microns to about 3 microns, including all ranges and subranges therebetween. A height c of each recess 103 can similarly range from about 0.5 microns to about 3 microns, from about 0.75 microns to about 2.5 microns, from about 1 microns to about 2 microns, or from about 1.25 microns to about 1.5 microns, including all ranges and subranges therebetween. According to various embodiments, the width or diameter d and height c of a recess 103 can be identical or different. In additional embodiments, the width or diameter d of a recess 103 can be approximately twice the height c, e.g., semi-circular recesses, as illustrated. In still further embodiments, as illustrated the width or diameter d and/or height c of each recess 103 can be substantially identical to the width or diameter d and/or height c of the other recesses in the plurality of arch-shaped recesses. Of course, different heights and/or widths and/or shapes among the plurality of recesses 103 are envisioned and intended to fall within the scope of the disclosure.

Still referring to FIG. 1B, each recess 103 can comprise, in various embodiments, an apex, 107, and two end points 109. The distance between the recesses can be defined as a distance a between two apexes 107 of adjacent recesses 107 and/or as a distance b between two edges or end points 109 of adjacent recesses 107. In some embodiments, the distance a can range from about 3 microns to about 12 microns, such as from about 4 microns to about 11 microns, from about 5 microns to about 10 microns, from about 6 microns to about 9 microns, or from about 7 microns to about 8 microns, including all ranges and subranges therebetween. According to additional embodiments, the distance b can range from about 3 microns to about 10 microns, such as from about 4 microns to about 9 microns, from about 5 microns to about 8 microns, or from about 6 microns to about 7 microns, including all ranges and subranges therebetween.

Figure 2:
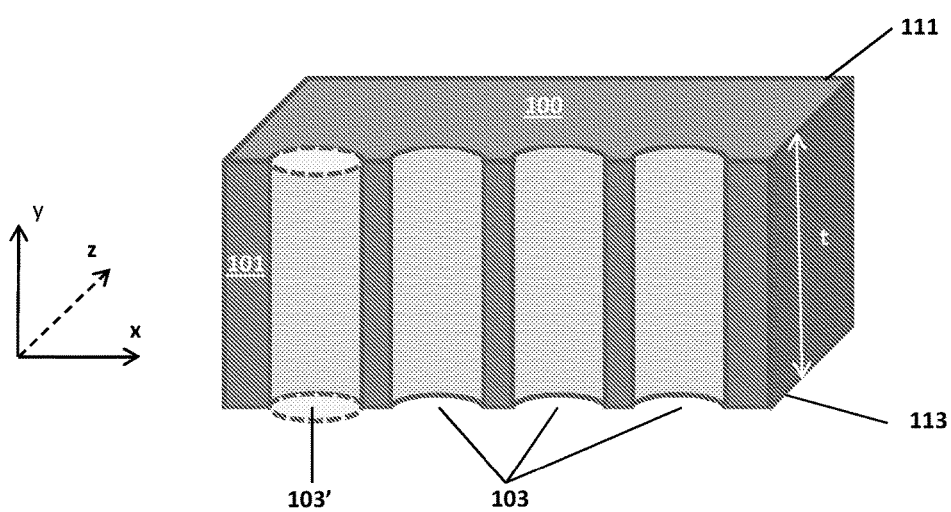
FIG. 2 illustrates a perspective view of the side edge of the light guide plate of FIG. 1A.

A perspective view of the side edge 101 is provided in FIG. 2. From this view it can be appreciated that the arch-shaped recesses 103 can be envisioned as semi-cylindrical voids (depicted as 103' for purposes of discussion) carved into the side edge 101, wherein the longitudinal axis of the cylinder would correspond to a thickness t extending between a first surface 111 and a second surface 113 of the light guide plate 100. Of course, the recesses 103 need not be perfectly rounded or semi-circular and can have any arcuate shape as defined herein. Moreover, while the arch-shaped recesses 103 are illustrated in FIGS. 1-2 as spaced-apart, it is also possible to provide a side edge 101 comprising interconnected recesses, as discussed in more detail below.

Figure 3A:
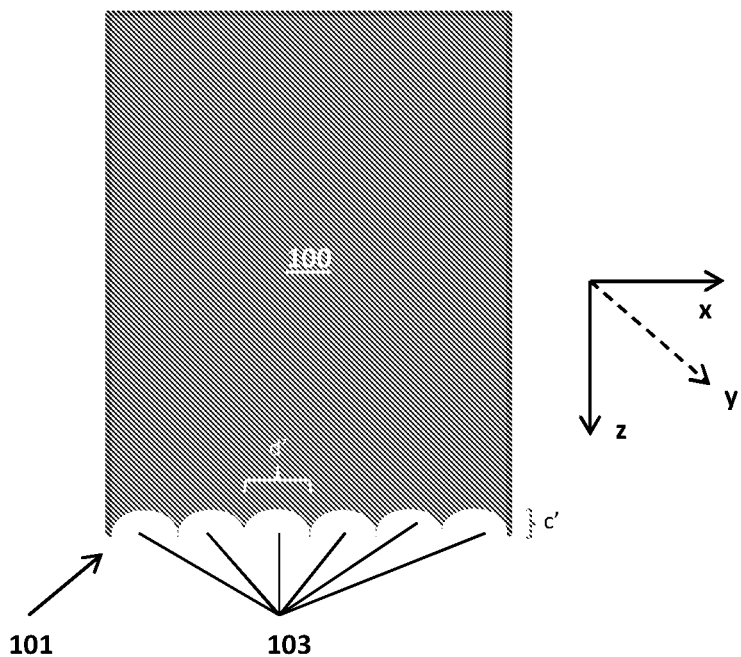
FIG. 3A illustrates an exemplary embodiment of a light guide plate comprising a side edge having a plurality of interconnected arch-shaped recesses.
Figure 3B:
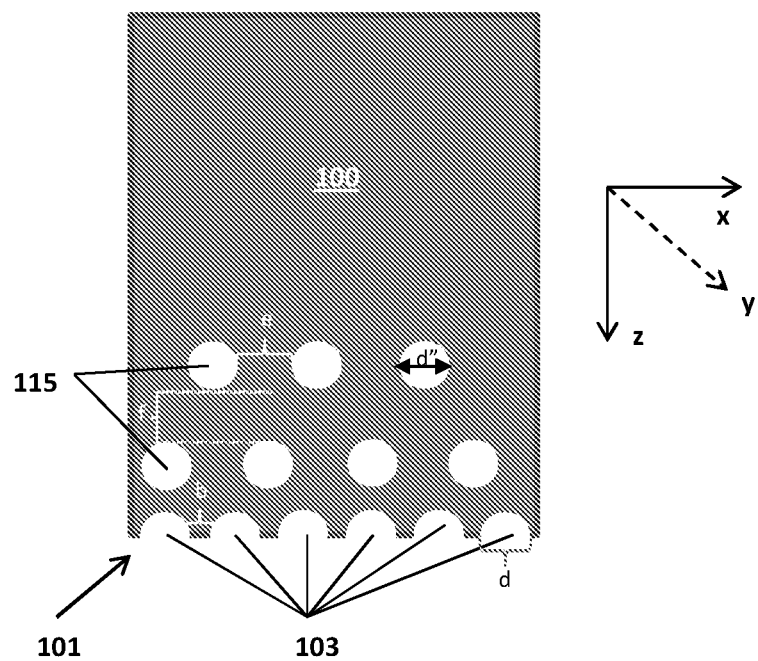
FIG. 3B illustrates an exemplary embodiment of a light guide plate comprising a plurality of additional holes proximate the side edge.

Additional embodiments of a light guide according to the disclosure are illustrated in FIGS. 3A-B. In such embodiments, it may be possible to modify or incorporate additional features to further widen the angle of light diffusion in the (X/Z) plane. For example, in FIG. 3A, the side edge 101 of the light guide plate 100 can be provided with a plurality of interconnected, or "scalloped," recesses 103, e.g., recesses that abut one another (referring to FIG. 1B, distance b=0). According to various embodiments, the width or diameter d' and/or height c' of the interconnected recesses 103 can be larger than the width or diameter d and/or height c of the spaced-apart recesses depicted in FIG. 1B. For example, the width or diameter d' of the interconnected recesses can range from about 3 microns to about 8 microns, such as from about 4 microns to about 7 microns, or from about 5 microns to about 6 microns, including all ranges and subranges therebetween. Similarly, the height c' of the interconnected recesses can range from about 3 microns to about 8 microns, such as from about 4 microns to about 7 microns, or from about 5 microns to about 6 microns, including all ranges and subranges therebetween. Methods for forming spaced-apart and interconnected arch-shaped recesses 103 are discussed in more detail below.

As illustrated in FIG. 3B, the side edge 101 of the light guide plate 100 can comprise a plurality of arch-shaped recesses 103, as well as a plurality of holes 115 adjacent or proximate the side edge 101. The plurality of holes 115 can be arranged substantially in one or more lines or rows of lines. Although two rows of lines are illustrated in FIG. 3B, it is envisioned that one row or more than two rows (such as 1, 2, 3, 4, 5, or more rows of holes) can be included, without limitation. Furthermore, the orientation, spacing, and/or size of the holes is not limited to the depicted configuration and any spacing, orientation, and/or size, and combinations thereof, without limitation, is envisioned and intended to fall within the scope of the disclosure. According to some non-limiting embodiments, the plurality of holes can be arranged in rows that are off-set from one another (as illustrated), which may provide additional dispersion and/or propagation of light, or that are substantially aligned in both in the x and z directions. Of course other arrangements, including symmetrical and asymmetrical arrangements, can be provided and are intended to fall within the scope of the disclosure.

In various embodiments, and with continued reference to FIG. 3B, the plurality of holes 115 can have a diameter d" that is substantially identical to the diameter d of the arch-shaped recesses 103 (as illustrated). In other embodiments, the diameter d" can be different from the width or diameter d. Furthermore, each arch-shaped recess 103 and hole 115 can have a width or diameter d or d", respectively, that is different from another recess or hole in the light guide. For example, the light guide 100 can be provided with a first row of holes 115 with a diameter d"=d1 and a second row of holes 115 with a diameter d"=d2, wherein d1 or d2 can be the same or different as the width or diameter d of the recesses 103, and so on without limitation. In additional embodiments, the holes 115 can be spaced apart from each other and from the recesses 103 at distances e and f, which can be identical or different. According to various embodiments, the holes 115 can be spaced apart from each other and from the recesses 103 at a distance sufficient to prevent undesirable fracturing of the light guide. Thus, in certain embodiments, the holes 115 can be spaced apart such that e/d>5 and/or f/d>5 (e.g., >6, 7, 8, 9, 10, 12, 15, or greater). In other words, whereas distance b between the arch-shaped recesses may be chosen to enable separation of the glass sheet into two portions (e.g., by etching or crack propagation), distances e and/or f may be chosen to prevent breakage of the glass sheet in undesired directions and/or to ensure structural reliability of the glass sheet.

Figure 4A:
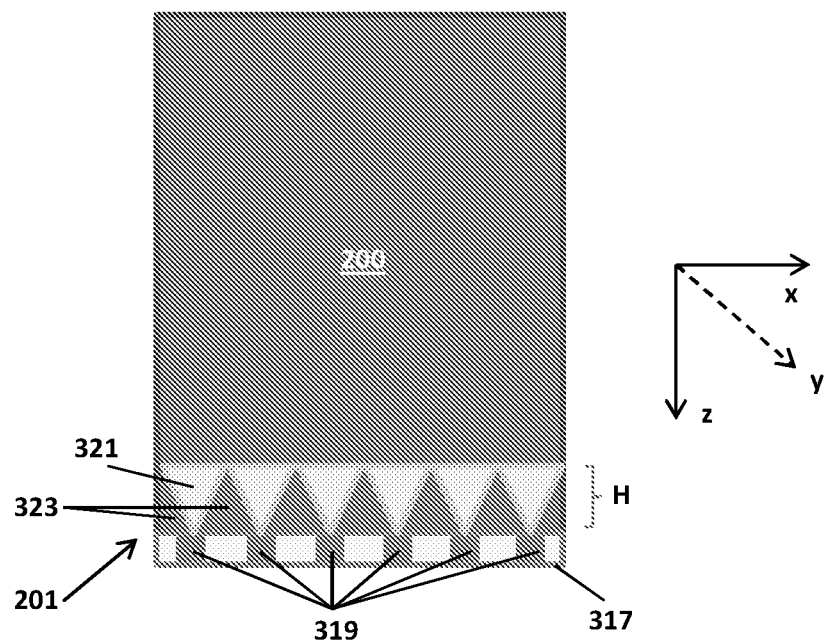
FIG. 4A illustrates a hot spot region produced by a prior art light guide plate having a planar side edge.

As illustrated in FIG. 4A, which depicts a light guide plate 200 having a substantially planar side edge 201, when an LED strip 317 is coupled to the side edge 201, each individual LED 319 generates light 321 which couples to and propagates through the light guide 200. The angle of diffusion is such that dead spaces 323 may exist adjacent the side edge 201 in between the individual LEDs 319. Because of the inhomogeneous light distribution in this region, which can extend a distance H along the z axis, e.g., the area in which the light from each LED does not overlap with one another, a bezel (not illustrated) is often included having a thickness greater than or equal to distance H, to conceal this inhomogeneous area from the viewer.

Figure 4B:
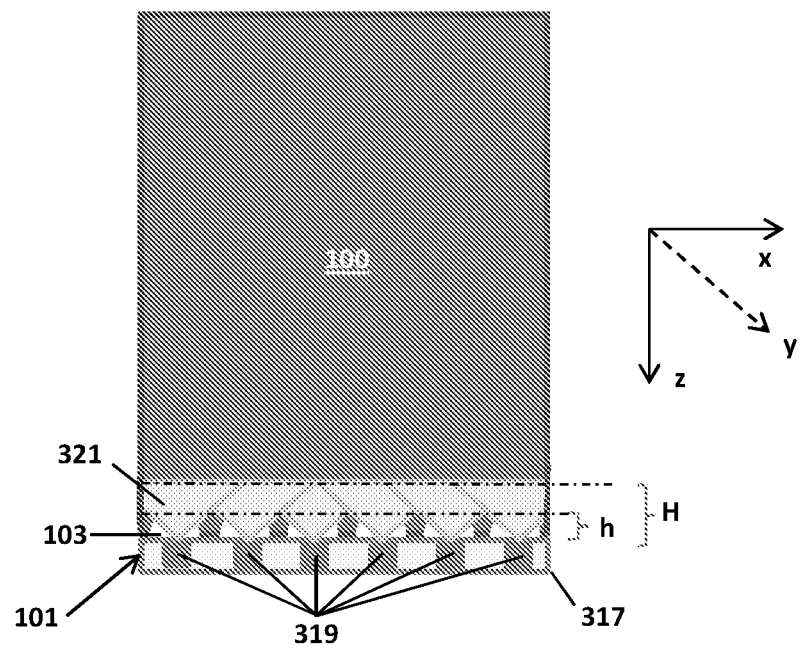
FIG. 4B illustrates a reduced hot spot regions produced by a light guide plate according to FIG. 1A.
Figure 5A:
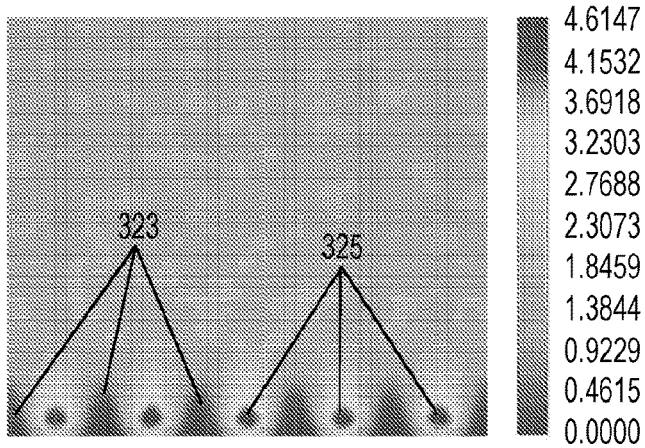
FIG. 5A depicts irradiance of a light guide corresponding to FIG. 4A.
Figure 5B:
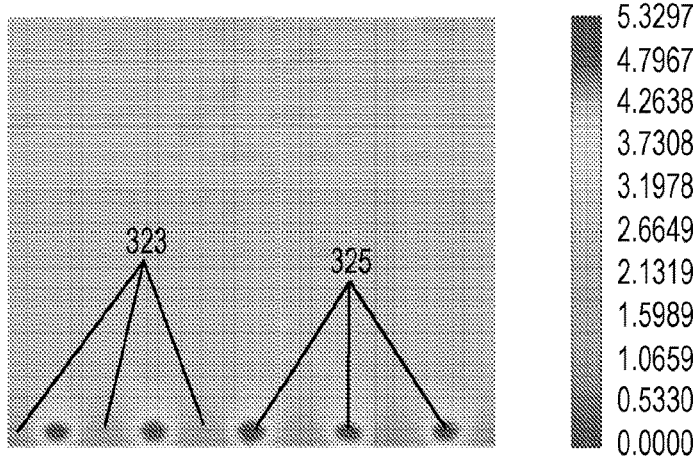
FIG. 5B depicts irradiance of an exemplary light guide corresponding to FIG. 4B.

In comparison, as illustrated in FIG. 4B, a light guide 100 according to some embodiments can have a side edge 101 comprising a plurality of arch-shaped recesses 103 that can be configured to diffuse the light from the optically coupled light source at a wider angle in the (X/Z) plane. By diffusing light at an increased angle in the (X/Z) plane, the distance h that the light must propagate along the z-axis of the light guide 100 before homogeneous light is achieved is reduced (as compared to distance H), i.e., dead spaces between the hot spots are reduced. FIGS. 5A-B, respectively, illustrate irradiance of a prior art light guide (without recesses, as depicted in FIG. 4A) as compared to the irradiance of a light guide according to FIG. 4B (with recesses). As can be seen from the plots, as compared to FIG. 5A the dead space 323 between hot spots 325 in FIG. 5B is substantially reduced as well as the length of the hot spot zone overall (h<H).

Figure 6:
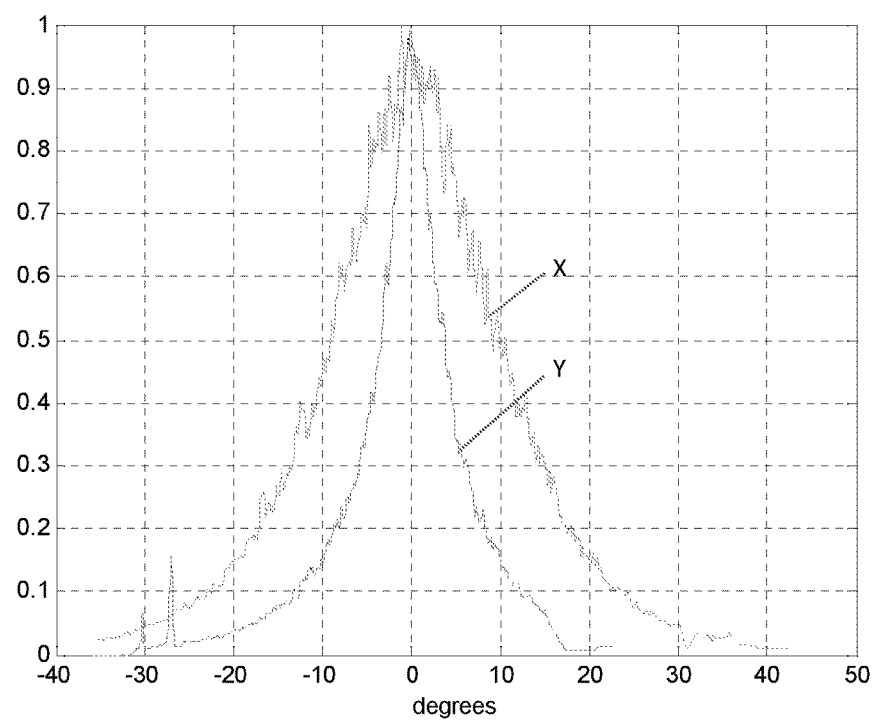
FIG. 6 is a plot comparing light diffusion along the X and Y direction for a glass light guide plate having a side edge comprising a plurality of arch-shaped regions.

Moreover, FIG. 6 plots the diffusion function of light in the X and Y directions (X corresponding to the plane (X/Z) of the light guide and Y corresponding to the plane (Y/Z) extending perpendicular to the light guide). As shown in the plot, when utilizing a light guide comprising a side edge having a plurality of arch-shaped recesses, diffusion along the plane of the light guide (X direction) is greater than the diffusion perpendicular to the light guide (Y direction). Thus, light guides according to various embodiments disclose herein can effectively diffuse light along the plane of the light guide while minimizing light leakage in a direction perpendicular to the guide.

Methods

Further disclosed herein are methods for making glass light guide plates, comprising providing a glass sheet having at least one side edge, a first surface, and an opposing second surface, and a thickness extending therebetween. The glass sheet can be processed to provide a plurality of rounded holes through the thickness of the sheet, wherein the holes can be arranged substantially in a line. The glass sheet can then be separated into two portions along the line of rounded holes, thereby providing at least one portion with a new side edge comprising a plurality of arch-shaped recesses. As used herein the term "rounded" holes is intended to denote holes having rounded edges, e.g., circular or elliptical holes, as opposed to linear dashes or perforations used in conventional scoring techniques. A method for producing the light guide plate depicted in FIG. 1A, and having a side edge 101 comprising a plurality of spaced-apart arch-shaped recesses 103, will now be described with reference to FIGS. 7A-C.

A glass sheet 400 can be provided having a first surface, an opposing second surface, and a thickness extending therebetween, and at least one side edge. As illustrated in FIG. 7A, a plurality of rounded holes 427 may be provided, the rounded holes extending through the first and second surfaces, thereby spanning the thickness of the glass sheet. The holes 427 can be made, for example, by laser cutting. Non-limiting exemplary methods suitable for laser cutting glass, including cutting glass holes such as 427 and 115, are disclosed, for instance, in U.S. application Ser. Nos. 14/145, 525; 14/530,457; 14/535,800; 14/535,754; 14/530,379; 14/529,801; 14/529,520; 14/529,697; 14/536,009; 14/530, 410; and 14/530,244; and International Application Nos. PCT/EP14/055364; PCT/US15/130019; and PCT/US15/ 13026; all of which are incorporated herein by reference in their entireties. According to various embodiments, the rounded holes can be arranged substantially in a line. The line can, for example, be substantially perpendicular to at least one adjacent side edge 429.

Spacing and sizing of the rounded holes 427 can be similar to that described above with respect to the arch-shaped recesses 103. For instance, as discussed below, an arch-shaped recess 103 can comprise the same geometry as a segment of rounded hole 427 (e.g., a rounded hole 427 when cut in half will yield a semi-circular arch-shaped recess 103, and so forth). Of course, in some embodiments, the arch-shaped recess 103 may not comprise the same geometry as the rounded hole 427 (e.g., in the case of etching). Spacing of the rounded holes 427 according to this crack propagation method can be similar to the distance b illustrated in FIG. 1B. For example, a distance between the edges of two adjacent rounded holes 427 can range from about 3 microns to about 10 microns, such as from about 4 microns to about 9 microns, from about 5 microns to about 8 microns, or from about 6 microns to about 7 microns, including all ranges and subranges therebetween.

As shown in FIG. 7B, a crack 431 can be propagated between the holes 427, thereby allowing for the separation of the glass into two portions 433 and 435. The crack 431 can, for example, be a line substantially perpendicular to at least one adjacent side edge 429. Separation of the two glass portions can be achieved using any method known in the art, for example, pressure or force can be applied to the glass sheet on either side of the crack 431 such that the sheet snaps or breaks along the line of holes 127. The resulting light guide plate 500 (portion 435) is illustrated in FIG. 7C, having a side edge 501 with a plurality of arch-shaped recesses 503 as described above with respect to FIG. 1A. Portion 433 is also depicted for illustrative purposes. In some embodiments, the described method can be used to create two light guides having substantially identical recesses 503.

Methods for forming the light guides of FIGS. 3A-B are also disclosed herein, although not illustrated in the figures. A light guide of FIG. 3A can be prepared for example, following the procedure outlined above with respect to FIGS. 7A-C. A further step of etching can then be employed to enlarge the arched recesses such that they become interconnected, e.g., the side edges of the recesses abut one another (as shown in FIG. 3A). Alternatively, after the rounded holes 427 are cut into the glass sheet as illustrated in FIG. 7A, the glass sheet can be etched for a period of time sufficient to enlarge the holes until they touch, thereby separating the glass sheet without the step of crack propagation. Etching can be carried out using any process known in the art, for example, immersion in an acid bath, such as hydrofluoric acid and/or hydrochloric acid. In addition to enlarging the holes and widening the resulting arch-shaped recesses and, thus, the angle of diffusion along the (X/Z) plane, etching may also smooth the surface of the side edge, thereby reducing the number of flaws which could otherwise create random diffusion in the (Y/Z) plane and improving optical coupling of the light guide plate with a light source.

Spacing of the rounded holes 427 according to this etching method can be similar to or larger than the distance b illustrated in FIG. 1B. For example, a distance between the edges of two adjacent rounded holes 427 can range from about 3 microns to about 10 microns, such as from about 4 microns to about 9 microns, from about 5 microns to about 8 microns, or from about 6 microns to about 7 microns, including all ranges and subranges therebetween. In some embodiments, the distance between rounded holes 427 can be greater than 10 microns, such as about 12, 14, 16, 18, or 20 microns. For example, the holes 427 may be set apart at a larger distance (>10 microns) such that the glass sheet cannot be separated by crack propagation. Subsequently, etching can be used to expand the diameter of the holes 427 until the edges touch and the glass separates into two portions.

A light guide of FIG. 3B can be prepared, for instance, following the procedure outlined above with respect to FIGS. 7A-C. A further step of providing the plurality of additional holes 115 can be employed before and/or after the steps illustrated in FIGS. 7A-C. For instance, several rows of holes can be cut into the glass sheet at one time, one row corresponding to rounded holes 427 of FIG. 7A and one or more rows corresponding to additional holes 115 of FIG. 3B. A crack can then be propagated across rounded holes 427, and the glass sheet separated into two portions, one of which comprises the plurality of holes 115. The additional holes 115 can be drilled using the same cutting technique discussed above with respect to rounded holes 427 which are provided to form the plurality of arch-shaped recesses 403. Alternatively, the additional holes 115 can be provided in the glass sheet after formation of the arch-shaped recesses, e.g., by cutting additional holes 115 in the light guide 500 illustrated in FIG. 7C.

According to various embodiments, the first and/or second surface of the light guide plate may be patterned with a plurality of light extraction features. As used herein, the term "patterned" is intended to denote that the plurality of elements and/or features are present on the surface of the light guide in any given pattern or design, which may, for example, be random or arranged, repetitive or non-repetitive. For instance, in the case of light extraction features, such features may be distributed across the second surface, e.g. as textural features making up a roughened surface.

In various embodiments, the light extraction features present on the first and/or second surface of the light guide plate may comprise light scattering sites. For example, the first surface of the light guide plate may be textured, etched, coated, damaged and/or roughened to produce the light extraction features. Non-limiting examples of such methods include, for instance, laser damaging the surface, acid etching the surface, and coating the surface with $TiO_2$. In certain embodiments, a laser can be used both to cut holes into the glass sheet and to damage the first and/or second surface to create light extraction features. According to various embodiments, the extraction features may be patterned in a suitable density so as to produce a substantially uniform illumination. The light extraction features may produce surface scattering and/or volumetric scattering of light, depending on the depth of the features in the glass surface. The optical characteristics of these features can be controlled, e.g., by the processing parameters used when producing the extraction features.

The glass light guide may be treated to create light extraction features according to any method known in the art, e.g., the methods disclosed in co-pending and co-owned International Patent Application No. PCT/US2013/063622, incorporated herein by reference in its entirety. For example, a glass sheet may be ground and/or polished to achieve the desired thickness and/or surface quality. The glass may then be optionally cleaned and/or the surface of the glass to be etched may be subjected to a process for removing contamination, such as exposing the surface to ozone.

The glass sheet may also be chemically strengthened, e.g., by ion exchange. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 4 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress.

The surface to be etched may, by way of a non-limiting embodiment, be exposed to an acid bath, e.g., a mixture of glacial acetic acid (GAA) and ammonium fluoride ($NH_4F$) in a ratio, e.g., ranging from about 1:1 to about 9:1. The etching time may range, for example, from about 30 seconds to about 15 minutes, and the etching may take place at room temperature or at elevated temperature. Process parameters such as acid concentration/ratio, temperature, and/or time may affect the size, shape, and distribution of the resulting extraction features. It is within the ability of one skilled in the art to vary these parameters to achieve the desired surface extraction features.

As used herein, the term "optically coupled" is intended to denote that a light source is positioned at an edge of the glass light guide so as to introduce light into the guide. When light is injected into the light guide, according to certain embodiments, the light is trapped and bounces within the light guide due to total internal reflection (TIR) until it hits a light extraction feature on the first or second surface.

The light guide plates disclosed herein may be used in various display devices including, but not limited to LCDs. Traditional backlight units used in LCDs can comprise various components. One or more light sources may be used, for example light-emitting diodes (LEDs) or cold cathode fluorescent lamps (CCFLs). Conventional LCDs may employ LEDs or CCFLs packaged with color converting phosphors to produce white light. According to various aspects of the disclosure, display devices employing the disclosed glass light guides may comprise at least one light source emitting blue light (UV light, approximately 100-400 nm), such as near-UV light (approximately 300-400 nm).

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes examples having two or more such light sources unless the context clearly indicates otherwise. Likewise, a "plurality" is intended to denote "more than one." As such, a "plurality of color converting elements" includes two or more such elements, such as three or more such elements, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A glass light guide plate comprising:
   a first surface, an opposing second surface, and a thickness extending therebetween;
   at least one side edge comprising a plurality of arch-shaped recesses; and
   a plurality of rounded holes extending through the thickness of the glass light guide plate and located proximate the at least one side edge.

2. The glass light guide plate of claim 1, wherein the arch-shaped recesses have a width ranging from about 1 micron to about 5 microns.

3. The glass light guide plate of claim 1, wherein the arch-shaped recesses have a height ranging from about 0.5 microns to about 3 microns.

4. The glass light guide plate of claim 1, wherein a ratio of a distance between the rounded holes to a diameter of the rounded holes is greater than about 5.

5. The glass light guide plate of claim 1, wherein the at least one side edge comprises a plurality of spaced-apart arch-shaped recesses.

6. The glass light guide plate of claim 5, wherein a distance between end points of adjacent arch-shaped recesses in the plurality of arch-shaped recesses ranges from about 3 microns to about 12 microns.

7. The glass light guide plate of claim 1, wherein the at least one side edge comprises a plurality of interconnected arch-shaped recesses.

8. The glass light guide plate of claim 1, wherein the glass light guide plate comprises aluminosilicate, alkali-aluminosilicate, borosilicate, alkali-borosilicate, alum inoborosilicate, alkali-alum inoborosilicate, or combinations, thereof.

9. The glass light guide plate of claim 1, wherein the thickness of the glass light guide plate ranges from about 0.3 mm to about 3 mm.

10. A liquid crystal display comprising the glass light guide plate of claim 1.

* * * * *

UNITED STATES PATENT AND TRADEMARK OFFICE
CERTIFICATE OF CORRECTION

PATENT NO. : 10,241,256 B2
APPLICATION NO. : 15/572619
DATED : March 26, 2019
INVENTOR(S) : Jacques Gollier Page 1 of 1

It is certified that error appears in the above-identified patent and that said Letters Patent is hereby corrected as shown below:

On the Title Page

Column 1, item (73), Assignee, Line 1, delete "Incorporatedf," and insert -- Incorporated, --, therefor.

In the Claims

In Column 12, Lines 36-37, Claim 8, delete "alum inoborosilicate," and insert -- aluminoborosilicate, --, therefor.

In Column 12, Line 37, Claim 8, delete "alum inoborosilicate," and insert -- aluminoborosilicate, --, therefor.

Signed and Sealed this
Sixth Day of August, 2019

Andrei Iancu
*Director of the United States Patent and Trademark Office*